United States Patent [19]

Yamaguchi et al.

[11] Patent Number: 4,946,374

[45] Date of Patent: Aug. 7, 1990

[54] MAGNETIC RECORDING MEDIUM

[75] Inventors: Satoru Yamaguchi, Kyoto; Jozo Shimizu, Nagaokakyo; Kozaburoh Satoh, Kameoka; Haruo Andoh, Suita, all of Japan

[73] Assignee: Hitachi Maxell, Ltd., Osaka, Japan

[21] Appl. No.: 287,648

[22] Filed: Dec. 21, 1988

Related U.S. Application Data

[63] Continuation of Ser. No. 590,467, Mar. 16, 1984, abandoned.

[30] Foreign Application Priority Data

Mar. 20, 1983 [JP] Japan .................................. 58-46186

[51] Int. Cl.$^5$ ............................................. G11B 23/00
[52] U.S. Cl. .................................... 428/323; 427/131; 428/329; 428/694; 428/900
[58] Field of Search ............... 428/323, 329, 694, 900; 427/131

[56] References Cited

U.S. PATENT DOCUMENTS

| 4,075,384 | 2/1978 | Suzuki et al. | 427/131 |
|---|---|---|---|
| 4,210,946 | 7/1980 | Iwasaki et al. | 427/131 |
| 4,237,189 | 12/1980 | Deffeyes | 428/457 |
| 4,281,043 | 7/1981 | Deffeyes | 428/694 |
| 4,409,281 | 10/1983 | Kitamoto et al. | 428/694 |
| 4,410,583 | 10/1983 | Hanoaka | 428/694 |
| 4,410,590 | 10/1983 | Kawahara et al. | 428/694 |
| 4,442,159 | 4/1984 | Dezawa et al. | 428/900 |

FOREIGN PATENT DOCUMENTS

| 2507975 | 3/1974 | Fed. Rep. of Germany | 427/131 |
|---|---|---|---|
| 0093123 | 7/1981 | Japan | 428/694 |
| 0143352 | 11/1981 | Japan | 428/694 |
| 2042370 | 9/1980 | United Kingdom | 427/131 |

Primary Examiner—Paul J. Thibodeau
Attorney, Agent, or Firm—Birch, Stewart, Kolasch & Birch

[57] ABSTRACT

A magnetic recording medium which comprises a first magnetic layer on a base and a second magnetic layer thereon, the first magnetic layer containing magnetic particles having an average particle length (long axis diameter) of 0.4 to 0.7 $\mu$, the second magnetic layer containing magnetic particles having an average particle length (long axis diameter) of 0.25 to 0.35 $\mu$, the coercive force of which being 370 to 460 oersteds, and the ratio of coercive force of the upper or second layer to that of the lower or first magnetic layer being 1.05/1 to 1.5/1. The magnetic recording medium has excellent sensitivity and frequency characteristics at entire frequency bands with less noise.

11 Claims, 4 Drawing Sheets

MAGNETIC RECORDING MEDIUM

This application is a combination of application Ser. No. 06/590,467 filed on Mar. 16, 1984, now abandoned.

BACKGROUND OF THE INVENTION

The present invention relates to a magnetic recording medium having two magnetic layers. More particularly, it relates to a magnetic recording medium having an upper magnetic layer of a higher coercive force and a lower magnetic layer of a lower coercive force, which has improved sensitivity and frequency characteristics across broad frequency bands with less noise.

It has been known that in a magnetic recording medium having two magnetic layers, the sensitivity and frequency characteristics at both low and high frequency bands can be improved by making the coercive force of the lower layer low and that of the upper layer high. Such a magnetic recording medium is usually produced by first applying a magnetic paint composition containing magnetic particles of a relatively low coercive force onto a base film, such as a polyester film and drying the composition to form the lower magnetic layer, and then applying a magnetic paint composition containing magnetic particles of a relatively higher coercive force onto the lower magnetic layer and then drying the latter composition to form the upper magnetic layer.

However, a conventional magnetic recording medium of this type is produced by using almost the same particle size of $\gamma\text{-Fe}_2\text{O}_3$ particles in both the upper and lower magnetic layers, and hence, such recording medium shows insufficient improvement in lowering of noise level. Further, although in such magnetic recording medium, sensitivity and frequency characteristics at both low and high frequency bands are improved by a lower layer of lower coercive force and an upper layer of higher coercive force, it has such a drawback that the curve of the frequency characteristics slacks at the medium band, i.e., the frequency characteristics at the medium band drops. Particularly, although a magnetic recording medium having a lower layer of $\gamma\text{-Fe}_2\text{O}_3$ particles and an upper layer of $\text{CrO}_2$ particles shows good characteristics, it has such a drawback that frequency characteristics thereof at the medium band is remarkably decreased, i.e., the magnetic recording medium shows considerable slack of frequency characteristics curve.

SUMMARY OF THE INVENTION

The present invention relates to
an improved magnetic recording medium having two magnetic layers, which shows excellent sensitivity and frequency characteristics over the entire frequency band with less noise. As a result, it has been found that a magnetic recording medium of two layers having desired improved frequency characteristics and sensitivity over the entire frequency bands with no slack of the curve of frequency characteristics at the medium band and sufficient lowering of noise can be obtained by using magnetic particles having an average particle length (long axis diameter) of 0.4 to 0.7 $\mu$ in the lower magnetic layer and magnetic particles having an average particle length (long axis diameter) of 0.15 to 0.35 $\mu$ in the upper magnetic layer so as to obtain an upper magnetic layer having, a coercive force of 370 to 460 oersteds, and maintaining the ratio of coercive forces between the upper and lower magnetic layers (i.e. the coercive force of the upper magnetic layer/the coercive force of the lower magnetic layer) within the range of 1.05/1 to 1.5/1.

An object of the present invention is to provide a magnetic recording medium having two magnetic layers of which the curve of the frequency characteristics is not slack at the medium band. Another object of the invention is to provide a magnetic recording medium having two magnetic layers which has improved sensitivity and frequency characteristics over the entire frequency bands with less noise.

BRIEF DESCRIPTION OF THE DRAWINGS

These objects as well as other objects and advantages of the present invention will be apparent to persons skilled in the art from the following description with reference to the accompanying drawings wherein.

DETAILED DESCRIPTION OF THE INVENTION

According to the present invention, there is provided a magnetic recording medium which comprises a first magnetic layer on a base and a second magnetic layer thereon, the first magnetic layer containing magnetic particles having an average particle length (long axis diameter) of 0.4 to 0.7 $\mu$, the second magnetic layer containing magnetic particles having an average particle length (long axis diameter) of 0.15 to 0.35 $\mu$, the coercive force of which being 370 to 460 oersteds, and the ratio of the coercive force of the upper or second layer to that of the lower or first magnetic layer being 1.05/1 to 1.5/1.

The magnetic particles used in the upper magnetic layer of the magnetic recording medium of the present invention are preferably fine magnetic particles having an average particle length (long axis diameter) of 0.15 to 0.35 $\mu$ so that there is obtained sufficient low noise, high charging degree in the magnetic layer and high output, particularly, at the high frequency band. The magnetic particles used in the lower magnetic layer of the present magnetic medium are preferably the magnetic particles having an average particle length (long axis diameter)

of 0.4 to 0.7 $\mu$, so that there is obtained sufficient high output at low frequency band. When the magnetic particles of the lower magnetic layer have an average particle length of less than 0.4 $\mu$, the magnetic recording medium shows insufficient output at low frequency band because of poor orientation of magnetic particles and low packing density of magnetic particles of the magnetic layer.

Figure 1:
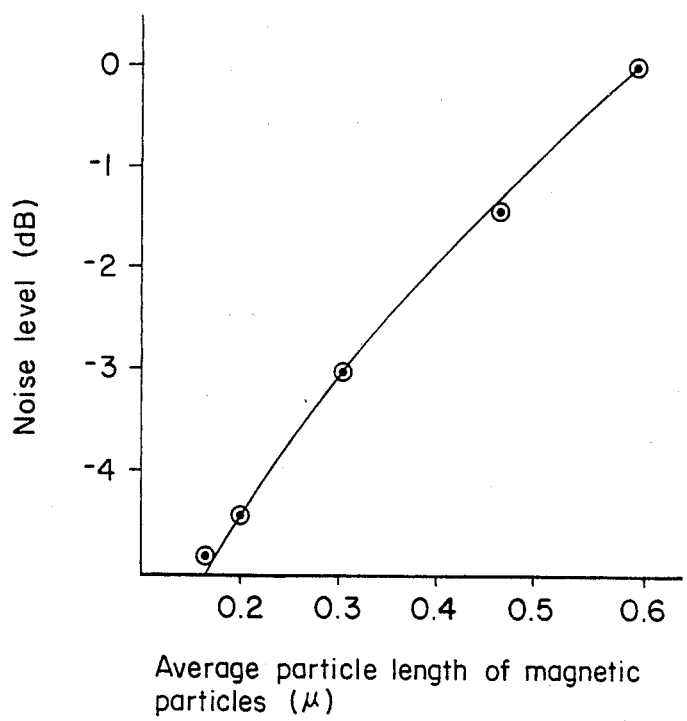
FIG. 1 shows the relation between noise level and an average particle length of magnetic particles in the present invention.
Figure 2:
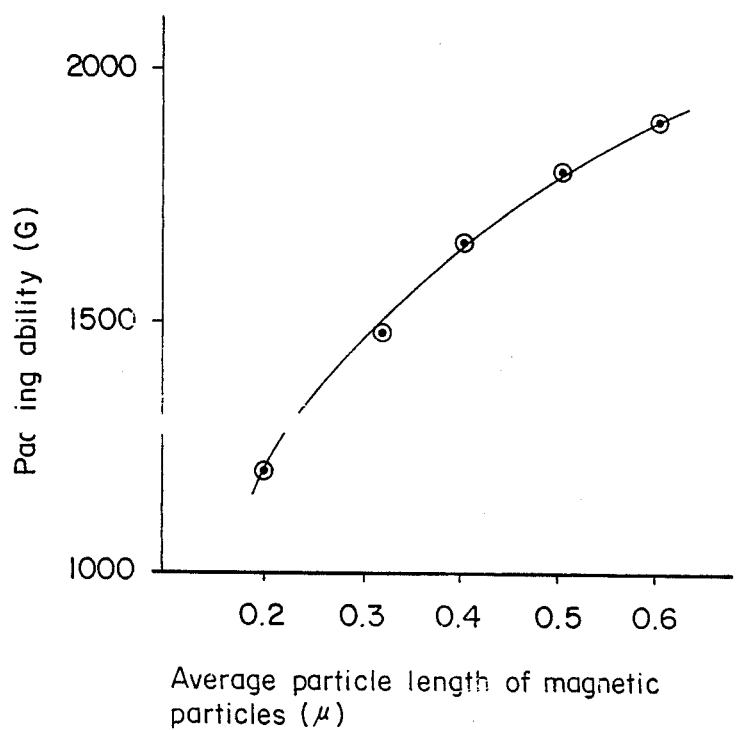
FIG. 2 shows the relation between packing ability and an average particle length of magnetic particles in the invention.

As is clear from FIGS. 1 and 2, when the particle size of magnetic particles becomes small, noise level is decreased but packing ability becomes poor. Thus, the magnetic particles used in the upper magnetic layer of the present magnetic medium has preferably an average particle length of 0.15 to 0.35 $\mu$, more preferably 0.2 to 0.3 $\mu$.

The magnetic recording medium obtained by using such magnetic particles has preferably a coercive force of 370 to 460 oersteds on the upper layer and the ratio of coercive force of the upper layer to that of the lower magnetic layer (i.e. the coercive force of upper magnetic layer/the coercive force of the lower magnetic layer) in the range of 1.05/1 to 1.5/1, so that there are obtained improved sensitivity and frequency characteristics at both low and high frequency bands, and there is no slack of the curve of frequency characteristics at the medium band with no adverse effect upon erasing characteristics. When the coercive force of the upper magnetic layer is less than 370 oersteds, there can not be obtained a sufficient output. On the other hand, when the coercive force of the upper magnetic layer is more than 460 oersteds, there is an adverse effect upon erasing characteristics. Further, when the ratio of coercive force of the upper layer to that of the lower magnetic layer is less than 1.05, there can not be obtained sufficient output at both low and medium frequency bands. On the other hand, when said ratio is more than 1.5, the curve of the frequency characteristics slacks at medium band, that is, the frequency characteristics at medium band drops.

Figure 3:
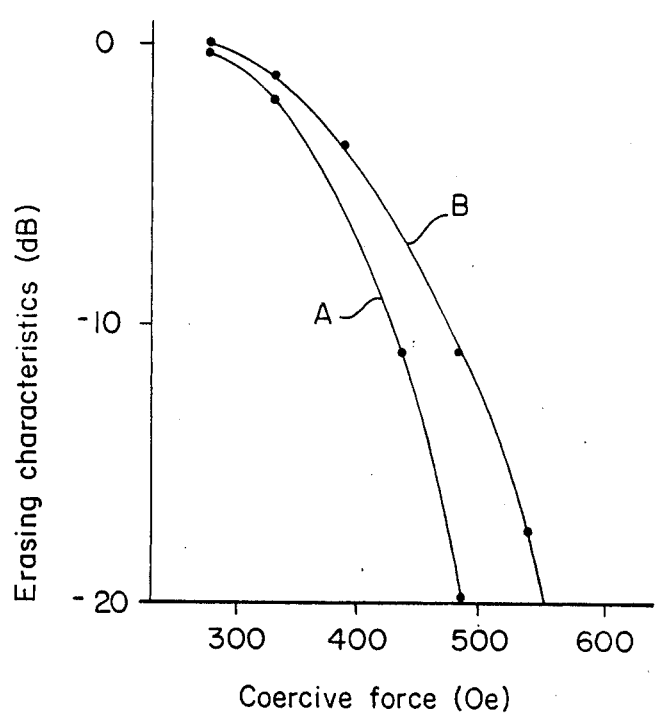
FIG. 3 shows the relation between erasing characteristics and the coercive force of the upper magnetic layer, when the upper magnetic layer is obtained by using magnetic particles having an average particle length of 0.25 $\mu$ (graph A) and 0.5 $\mu$ (graph B), respectively.

As shown in FIG. 3, it has been found that the coercive force of the upper magnetic layer of the magnetic recording medium having two magnetic layers has direct effects upon the output at high frequency band, and on the other hand, when the coercive force is too high, the magnetic recording medium shows poor erasing characteristics. Such effect is more significant when an average particle length of the magnetic particles is smaller. For example, in the case of magnetic particles having an average particle length of 0.15 to 0.35 $\mu$, the upper limit of the coercive force is 480 oersteds and, when the coercive force exceeds such limitation, there is an adverse effect upon the erasing characteristics and feel through hearing because of too high an output at high frequency band. Thus, it has been found that the upper magnetic layer has preferably a coercive force of 370 to 460 oersteds.

Figure 4:
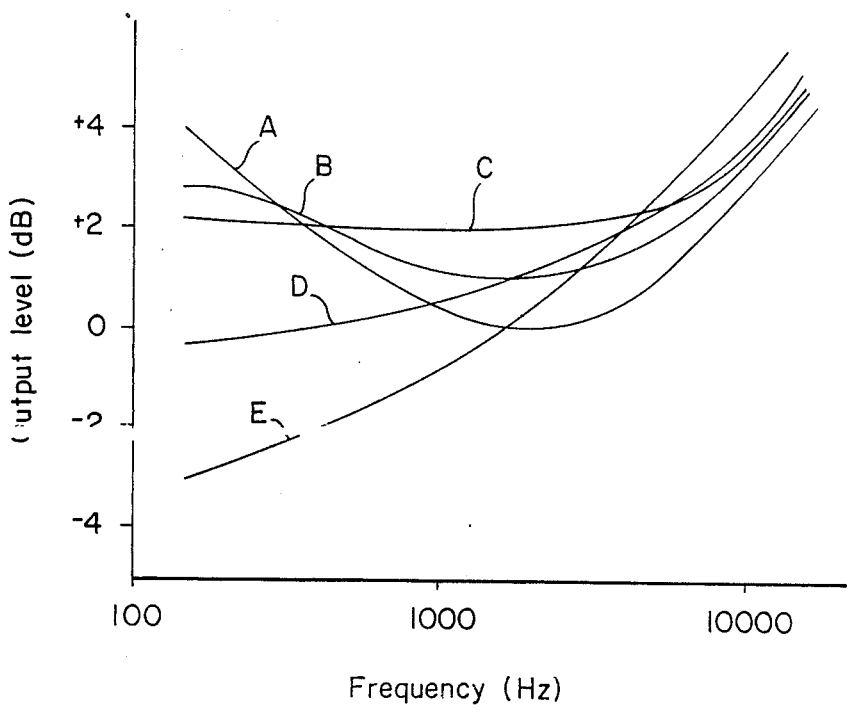
FIG. 4 shows the relation between output level and frequency at various ratio of coercive force between the upper and lower magnetic layers of the magnetic tape.

In FIG. 4, graph A shows frequency characteristics when the coercive force of the lower layer is adjusted to the ratio of coercive force of the upper layer to that of the lower magnetic layer of 1.8 by adjusting the coercive. force of the upper magnetic layer to 410 oersteds, the remanent magnetic flux density to 1300 gauss and the thickness to 2.5 $\mu$. Graph B shows the frequency characteristics of the same magnetic recording medium except that the ratio of coercive force of the upper layer to that of the lower magnetic layer is adjusted to 1.5 by changing the coercive force of the lower magnetic layer alone. Likewise, Graph C shows the frequency characteristics at the ratio of the coercive force of the upper layer to that of the lower magnetic layer of 1.2. Graph D shows the frequency characteristics at the ratio of the coercive force of the upper layer to that of the lower magnetic layer of 1.05. Graph E shows the frequency characteristics at the ratio of the coercive force of the upper layer to that of the lower magnetic layer of 1.0.

As is clear from FIG. 4, when the ratio of the coercive force of the upper layer/the coercive force of the lower layer is more than 1.5/1, the curve of frequency characteristics may slack considerably at medium frequency band. On ther other hand, when the ratio is less than 1.05, the output level at both the low and medium frequency bands is insufficient and this spoils the effect of the two magnetic layer structure. To the contrary, the magnetic recording medium having a ratio of the coercive force of the upper magnetic layer/the coercive force of the lower magnetic layer of 1.2 shows no slack in the curve of frequency characteristics and high output level over the entire frequency bands. Thus, it has been found that the coercive force of the upper and lower magnetic layers are preferably in the ratio of the coercive force of the upper magnetic layer to that of the lower magnetic layer of 1.05/1 to 1.5/1, more preferably 1.1/1 to 1.3/1.

Figure 5:
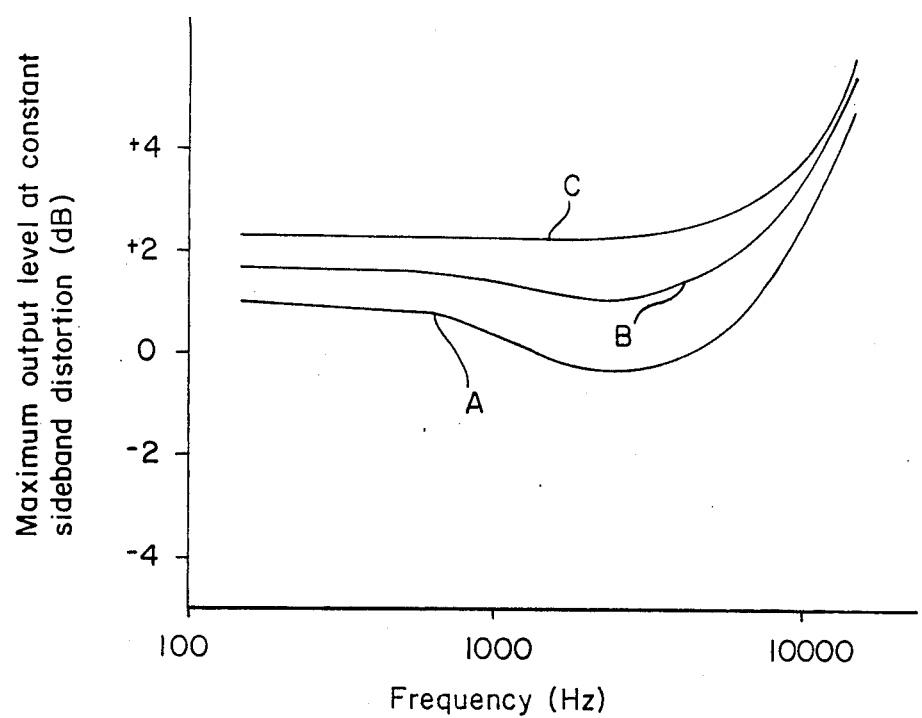
FIG. 5 shows the relation between maximum output level at constant distortion and frequency at various remanent magnetic flux densities of the upper layer.

FIG. 5 shows a relation between maximum output level at constant sideband distortion (M.T.L.) and frequency at various remanent magnetic flux densities. In these magnetic recording mediums having two magnetic layers, each lower magnetic layer contains $\gamma$-$Fe_2O_3$ magnetic particles having an average particle length of 0.5 $\mu$ and has a coercive force of 345 oersteds, a remanent magnetic flux density of 1800 gauss and a thickness of 3.0 $\mu$. On the other hand, each upper magnetic layer of these magnetic recording mediums contains $\gamma$-$Fe_2O_3$ magnetic particles having an average particle length of 0.25 $\mu$ and has a coercive force of 410 oersteds, a thickness of 2.5 $\mu$ and different remanent magnetic flux density i.e., 1000 gauss (graph A), 1300 gauss (graph B) or 1600 gauss (graph C). As is clear from FIG. 5, when the remanent magnetic flux density of the upper magnetic layer is decreased to less than 1300 gauss, the M.0.L.-frequency curves slack gradually at the medium frequency band. Thus, the upper magnetic layer has preferably a remanent magnetic flux density of not less than 1300 gauss, more preferably not less than 1600 gauss.

Figure 6:
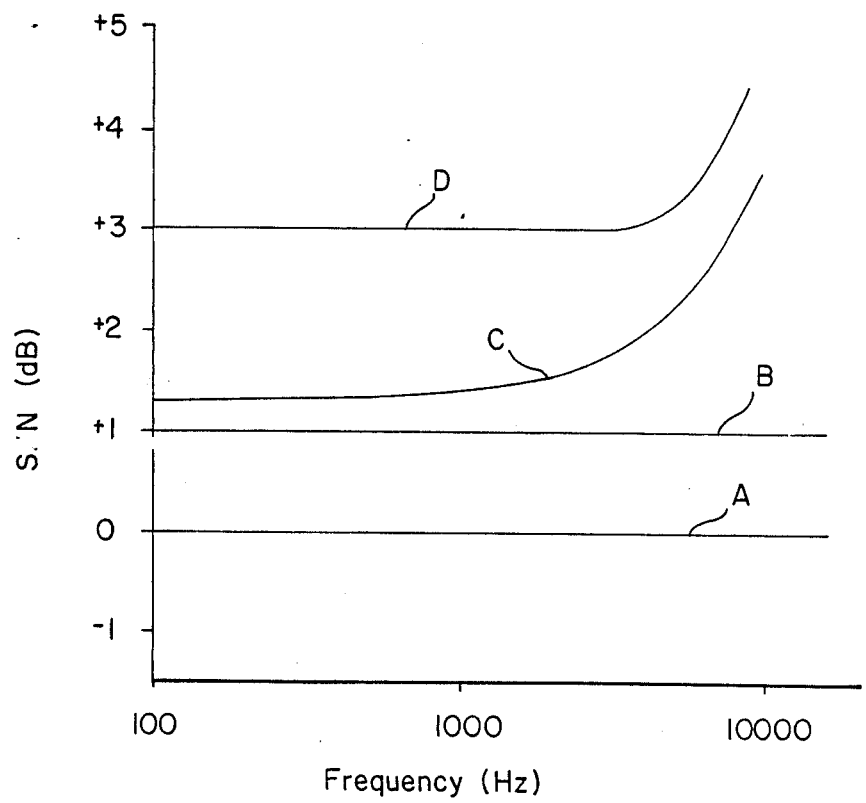
FIG. 6 shows the relation between S/N and frequency of magnetic recording medium having single or two magnetic layers containing magnetic particles of various particle sizes.

FIG. 6 shows a relation between S/N and frequency, when various magnetic particles having different particle size are employed in both the upper magnetic layer and lower magnetic layer or in single magnetic layer. In FIG. 6, graph A shows a relation between S/N and frequency when the magnetic recording medium has a single magnetic layer which contains $\gamma$-$Fe_2O_3$ particles having an average particle length of 0.5 $\mu$ and has a coercive force of 360 oersteds. Graph B shows the relation when the magnetic recording medium having two magnetic layers wherein the upper magnetic layer contains $\gamma$-$Fe_2O_3$ particles having an average particle length of not more than 0.25 $\mu$ and the lower magnetic layer contains $\gamma$-$Fe_2O_3$ particles having an average particle length of 0.5 $\mu$, the coercive force of both the upper and lower, magnetic layers being 360 oersteds. Graph C shows the relation when the magnetic recording medium having two magnetic layers wherein both the upper and lower magnetic layers contain $\gamma$-$Fe_2O_3$ particles having an average particle length of not more than 0.5 μ, and the coercive forces of the lower and upper magnetic layers are 345 and 410 oersteds, respectively. Graph D shows the relation when the magnetic recording medium having two magnetic layers wherein the upper magnetic layer contains γ-Fe$_2$O$_3$ particles having an average particle length of not more than 0.25 μ and the lower magnetic layer contains γ-Fe$_2$O$_3$ particles having an average particle length of 0.5 μ, the coercive forces of the lower and upper magnetic layers are 345 and 410 oersteds, respectively. As is clear from FIG. 6, the magnetic recording medium which is obtained by using γ-Fe$_2$O$_3$ particles having an average particle length of not more than 0.25 μin the upper magnetic layer and γ-Fe$_2$O$_3$ particles having an average particle length of 0.5 μ in the lower magnetic layer has excellent S/N ratio. Particularly, the magnetic recording medium which has the lower and upper magnetic layers having coercive forces of 345 and 410 oersteds respectively shows remarkably excellent S/N ratio. Thus, the magnetic recording medium having excellent improved S/N ratio can be obtained by using a magnetic particles having an average particle length of 0.15 to 0.35 μ in the upper magnetic layer and magnetic particles having an average particle length of 0.4 to 0.7 μ in the lower magnetic layer, adjusting the coercive force of the upper magnetic layer to 370 to 460 oersteds and the ratio of the coercive force of the upper layer to that of the lower magnetic layer 1.05/1 to 1.5/1.

It is preferable that the thickness of the upper magnetic layer is within the range of 1.5 to 3.0 μ, thickness of the lower magnetic layer is in the range of 2.5 to 3.5 μ and the ratio of the thickness of the upper layer to that of the lower magnetic layer is 3 : 7 to 6 : 5 (the thickness of the upper magnetic layer : the thickness of the lower magnetic layer). When the thickness of the upper magnetic layer is too large in comparison with that of the lower magnetic layer, the magnetic recording medium shows inferior output level at both the low and medium frequency bands, and on the other hand, when the thickness of the upper magnetic layer is too small in comparison with that of the lower magnetic layer, the magnetic recording medium shows a low output level at high frequency band and noise is insufficiently lowered.

Figure 7:
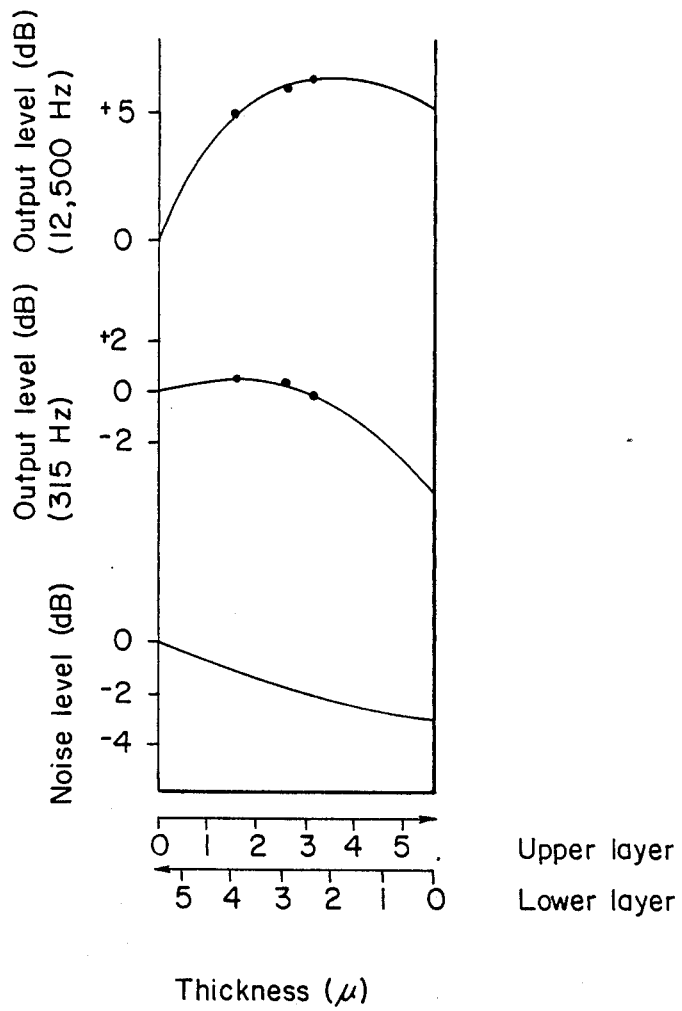
FIG. 7 shows the relation between noise level or output level and the ratio of thickness of the upper layer to that of lower magnetic layer.

FIG. 7 shows the relation between noise level or output level and the ratio of thickness of the upper layer and that of the lower magnetic layer at various frequency bands. In these magnetic mediums, the total thicknesses of the upper and lower magnetic layers are 5.5 μ and the ratios of the thicknesses are varied. Each lower magnetic layer has a coercive force of 345 oersteds and remanent magnetic flux density of 1800 gauss, and each upper magnetic layer has a coercive force of 410 oersteds and remanent magnetic flux density of 1300 gauss. As is clear from FIG. 7, when the thickness of the upper magnetic layer is more than 3 μ, the magnetic recording medium shows improved noise level and remarkably inferior output level at both low and medium bands, and on the other hand, when the thickness of the upper magnetic layer is less than 1.5 μ, the magnetic recording medium shows low output level at a high frequency band and also increased noise. Thus, it is preferably that the thickness of the upper magnetic layer is in the range of 1.5 to 3.0 μ, preferably 1.7 to 2.8 μ, the thickness of the lower magnetic layer is in the range of 2.5 to 3.5 μ and the ratio of the thickness of the upper layer and that of the lower magnetic layer is 3 : 7 to 6 : 5.

The magnetic particles which are employed in the upper and lower magnetic layers include all conventional magnetic particles, such as γ-Fe$_2$O$_3$ particles, Fe$_3$O$_4$ particles, γ-Fe$_2$O$_3$ particles containing Co, Fe$_3$O$_4$ particles containing Co, and the like.

These upper and lower magnetic layers can be formed by a conventional method. For example, a magnetic paint composition containing magnetic particles having an average particle length (long axis diameter) of 0.4 to 0.7 μ, a binder resin, an organic solvent and other conventional additives is applied onto a base film, such as a polyester film, in a usual manner and then the composition dried to form the lower magnetic layer, and thereafter, another magnetic paint composition containing magnetic particles having an average particle length (long axis diameter) of 0.15 to 0.35 μ, a binder resin, an organic solvent and other conventional additives is applied onto the lower magnetic layer in a usual manner and then the latter composition dried to form the upper magnetic layer.

The binder resin employed in the upper and lower magnetic layers include all conventional binder resins, such as vinyl chloride-vinyl acetate copolymer, polyvinylbutyral resin, cellulose resin, isocyanate compound, and the like.

Suitable examples of the organic solvent employed in the present invention include methyl isobutyl ketone, methyl ethyl ketone, cyclohexanone, toluene, ethyl acetate, tetrahydrofuran, dimethyl formamide, and the like. These organic solvents may be used alone or in combination thereof. The magnetic paint, composition may also contain other conventional additives, such as dispersing agents, lubricating agents, polishing agents, anti-static agents, or the like.

PREFERRED EMBODIMENT

The present invention is illustrated by the following Example but should not be construed to be limited thereto.

EXAMPLE 1

Preparation of a magnetic paint composition for a lower magnetic layer:

| Ingredients | Parts by weight |
| --- | --- |
| γ-Fe$_2$O$_3$ Particles (average particle length: 0.5μ) | 83 |
| VAGH (vinyl chloride-vinyl acetate-vinyl alcohol copolymer, manufactured by U. C. C.) | 10 |
| Urethane prepolymer | 7 |
| Lecitin | 1 |
| Colonate L (trifunctional low molecular weight isocyanate compound, manufactured by Nippon Polyurethane Kogyo K. K.) | 3 |
| Toluene | 50 |
| Methyl isobutyl ketone | 50 |

The above ingredients are mixed for about 72 hours with a ball mill to prepare a magnetic paint composition for a lower magnetic layer.

Preparation of a magnetic paint composition for an upper magnetic layer:

| Ingredients | Parts by weight |
| --- | --- |
| γ-Fe$_2$O$_3$ Particle containing Co (average particle length: 0.25μ) | 80 |

| Ingredients | Parts by weight |
| --- | --- |
| VAGH | 10 |
| Urethane prepolymer | 8 |
| Lecitin | 1 |
| Colonate L | 2 |
| Toluene | 50 |
| Methyl isobutyl ketone | 50 |

The above ingredients are mixed for about 72 hours with a ball mill to prepare a magnetic paint composition for an upper magnetic layer.

Preparation of a magnetic tape having two magnetic layers:

The magnetic paint composition for a lower magnetic layer prepared above is applied onto a polyester film (thickness: about 12 μ), and dried the composition. After surface-treatment, the coated composition is cured at 60° C. for 24 hours to form a lower magnetic layer (thickness: 3.0 μ). Onto the lower magnetic layer is applied the magnetic paint composition for an upper magnetic layer prepared above and then it is dried. By subjecting to surface-treatment and curing likewise, there is formed an upper magnetic layer (thickness: 2.5 μ). The resulting product is cut in a desired width to obtain a magnetic tape having two magnetic layers. The resulting magnetic tape having two layers composed of the lower layer having a coercive force of 345 oersteds and remanent magnetic flux density of 1800 gauss, and the upper layer having a coercive force of 410 oersteds and remanent magnetic density of 1300 gauss.

As to the magnetic tape obtained in Example 1, output level, maximum output level at constant distortion (M.O.L.) and S/N characteristics at various frequencies were measured to obtain frequency characteristics. These results are shown in the accompanying FIG. 4 (graph C), FIG. 5 (graph B) and FIG. 6 (graph D).

As is clear from these figures, the magnetic recording mediums of the present invention showed no slack of the curve of frequency characteristics at medium frequency band, improved frequency characteristics and sensitivity at entire frequency bands, and also sufficient less noise.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording medium which comprises a lower magnetic layer on a base and an upper magnetic layer thereon, said lower magnetic layer containing magnetic particles having an average particle length (long axis diameter) of 0.4 to 0.7 μ, said upper magnetic layer having a thickness of 1.5 to 3.0 μ and containing magnetic particles having an average particle length (long axis diameter) of 0.15 to 0.35 μ the coercive force of which is 370 to 460 oersteds, the ratio of the coercive force of the upper layer to that of the lower magnetic layer being 1.05/1 to 1.2/1, and the ratio of the thickness of the upper layer to that of the lower magnetic layer being 3/7 to 6/5.

2. A magnetic recording medium according to claim 1, wherein the upper magnetic layer contains magnetic particles having an average particle length (long axis diameter) of 0.2 to 0.3 μ.

3. A magnetic recording medium according to claim 1, wherein said upper magnetic layer has a remanent magnetic flux density of not less than 1,300 gauss.—

4. A magnetic recording medium according to claim 3, wherein said upper magnetic layer has a remanent magnetic flux density of not less than 1,600 gauss.—

5. A magnetic recording medium according to claim 1, wherein the upper magnetic layer contains magnetic particles having an average particle length (long axis diameter) of about 0.25 microns.—

6. A magnetic recording medium according to claim 1, wherein the lower magnetic layer contains magnetic particles having an average particle length (long axis diameter) of about 0.5 microns.—

7. A magnetic recording medium according to claim 1, wherein the lower magnetic layer has a thickness of about 3.0 microns.—

8. A magnetic recording medium according to claim 1, wherein the upper magnetic layer has a thickness of about 2.5 microns.—

9. A magnetic recording medium which consists essentially of a lower magnetic layer on a base and an upper magnetic layer thereon, said lower magnetic layer containing magnetic particles having an average particle length (long axis diameter) of 0.4 to 0.7 micron, said upper magnetic layer having a thickness of 1.5 to 3.0 microns and containing magnetic particles having an average particle length (long axis diameter) of 0.15 to 0.35 micron the coercive force of which is 370 to 460 oersteds, the ratio of the coercive force of the upper layer to that of the lower magnetic layer being 1.05/1 to 1.2/1, and the ratio of the thickness of the upper layer to that of the lower magnetic layer being 3/7 to 6/5.—

10. A magnetic recording medium according to claim 9, wherein the upper magnetic layer contains magnetic particles having an average particle length (long axis diameter) of 0.2 to 0.3 micron.—

11. A magnetic recording medium according to claim 10, wherein said upper magnetic layer has a remanent magnetic flux density of not less than 1,300 gauss.—

* * * * *